United States Patent
Brand et al.

(10) Patent No.: US 12,006,985 B2
(45) Date of Patent: Jun. 11, 2024

(54) PART HAVING A ROTATIONALLY SYMMETRIC REGION AND A MACHINING SURFACE, GEAR MOTOR, AND METHOD FOR MANUFACTURING THE PART FROM A BLANK

(71) Applicant: SEW-EURODRIVE GMBH & CO. KG, Bruchsal (DE)

(72) Inventors: Wolfgang Brand, Linkenheim-Hochstetten (DE); Tobias Rück, Oberderdingen-Flehingen (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 736 days.

(21) Appl. No.: 17/254,463

(22) PCT Filed: May 28, 2019

(86) PCT No.: PCT/EP2019/025158
§ 371 (c)(1),
(2) Date: Dec. 21, 2020

(87) PCT Pub. No.: WO2019/242882
PCT Pub. Date: Dec. 26, 2019

(65) Prior Publication Data
US 2021/0115978 A1    Apr. 22, 2021

(30) Foreign Application Priority Data
Jun. 22, 2018  (DE) ..................... 10 2018 004 950.8

(51) Int. Cl.
*F16D 1/108*    (2006.01)
*F16D 1/116*    (2006.01)
*F16D 3/50*    (2006.01)

(52) U.S. Cl.
CPC .............. *F16D 1/108* (2013.01); *F16D 1/116* (2013.01); *F16D 3/50* (2013.01)

(58) Field of Classification Search
CPC ................................ F16D 1/108; F16D 1/116
See application file for complete search history.

(56) References Cited

U.S. PATENT DOCUMENTS

| 486,052 A | * | 11/1892 | Mossberg | ........... F16C 33/4641 |
|---|---|---|---|---|
|  |  |  |  | 464/178 |
| 519,868 A |  | 5/1894 | Mossberg |  |

(Continued)

FOREIGN PATENT DOCUMENTS

| CN | 206704533 U | 12/2017 |
|---|---|---|
| DE | 4129111 A1 | 3/1993 |

(Continued)

OTHER PUBLICATIONS

International Search Report issued in corresponding International Application No. PCT/EP2019/025158, dated Dec. 12, 2019, pp. 1-2, English Translation.

*Primary Examiner* — Charles A Fox
*Assistant Examiner* — Gregory T Prather
(74) *Attorney, Agent, or Firm* — Carter, DeLuca & Farrell LLP

(57) ABSTRACT

In a part having a rotationally symmetric region and a machining surface, and a method for manufacturing the part from a blank, the machining surface is finished in a planar manner. The normal direction of the machining surface is oriented parallelly to the axis of symmetry, e.g., an axis of rotation, of the rotationally symmetric region. The part includes an annular groove that extends around in a circumferential direction, e.g., with respect to the axis of symmetry. In a circumferential angular region covered by the machining surface, the annular groove is incomplete, e.g., removed down to the groove base of the annular groove, and in a (Continued)

circumferential angular region not covered by the machining surface, the annular groove is complete, e.g., the machining surface bordering on the annular groove and/or leading into the annular groove.

21 Claims, 4 Drawing Sheets

(56) References Cited

U.S. PATENT DOCUMENTS

| | | | |
|---|---|---|---|
| 2,092,704 A | 9/1937 | Ricefield | |
| 2,710,763 A | 6/1955 | Gilbert | |
| 5,090,261 A | 2/1992 | Nakatsukasa | |
| 5,139,460 A | 8/1992 | Artunian | |
| 11,940,011 B2 * | 3/2024 | Vinson | F16D 1/06 |

FOREIGN PATENT DOCUMENTS

| | | |
|---|---|---|
| DE | 102016117466 A1 | 3/2018 |
| GB | 479629 A | 2/1938 |

* cited by examiner

PART HAVING A ROTATIONALLY SYMMETRIC REGION AND A MACHINING SURFACE, GEAR MOTOR, AND METHOD FOR MANUFACTURING THE PART FROM A BLANK

FIELD OF THE INVENTION

The present invention relates to a part having a rotationally symmetric region and a machining surface; a geared motor and to a method for manufacturing the part from a blank.

BACKGROUND INFORMATION

It is generally conventional that a planar surface may be produced on a blank by milling. Deburring is carried out as a subsequent manufacturing method step.

SUMMARY

Example embodiments of the present invention provide for simplifying the manufacture of a part.

According to an example embodiment of the present invention, a part is manufactured to have a rotationally symmetric region and a machining surface; the machining surface is produced in a planar manner; the normal direction of the machining surface is oriented parallelly to the axis of symmetry, e.g., an axis of rotation, of the rotationally symmetric region; the part includes an annular groove that extends around in a circumferential direction, e.g., with respect to the axis of symmetry; in a circumferential angular region covered by the machining surface, the annular groove is incomplete, e.g., removed down to the groove base of the annular groove; and in a circumferential angular region not covered by the machining surface, the annular groove is complete, e.g., the machining surface bordering on the annular groove and/or leading into the annular groove.

In this context, it is considered advantageous that after lathe-machining has initially occurred, an annular groove may be produced, and after that, the machining surface may be produced. In this manner, no extra expense is necessary, since the annular groove may be produced during the lathe-machining, that is, already in the same instance of chucking, e.g., using the same tool.

Therefore, a final deburring may be omitted, since an annular groove is cut into the part during the lathe-machining that is performed prior to the milling. This is because the run-out edge on the machining surface is consequently less sharp, and thus, burr formation is prevented or at least sharply reduced to such an extent, that subsequent deburring no longer has to be performed.

According to example embodiments, the surface is situated at an axial position covered by the annular groove. In this context, it is considered advantageous that when the milling cutter runs out at this surface, burr formation is prevented, and consequently, subsequent deburring may be dispensed with.

According to example embodiments, an axially projecting region is formed on the rotationally symmetric region, a region of the annular groove is situated between the rotationally symmetric region and the axially projecting region, and for example, the radial distance region covered by the rotationally symmetric region is contained in the radial distance region covered by the axially projecting region, or is surrounded by it. In this context, it is considered advantageous that a claw region is able to be brought out of the whole by milling, and that nevertheless, deburring is able to be dispensed with.

According to example embodiments, the part is a claw coupling part, the axially projecting region is a claw region, and the rotationally symmetric region is a cylindrical or hollow cylindrical region. In this context, it is considered advantageous that a free space is producible between the claw regions by milling, and that a machining surface is producible by milling, broaching, slotting, and/or drawing, the normal direction of the machining surface being oriented parallelly to the axis of symmetry, e.g., an axis of rotation.

In this case, it is further considered advantageous that the annular groove is effective as a centrifugal edge for oil flowing axially along the coupling part, since the coupling part is, for example, situated between a gear box filled at least partially with lubricating oil and an electric motor driving this gear box. Thus, the gear motor formed in this manner includes a gear box having lubricating oil and an electric motor to be operated oil-free. In the event of leakage, if lubricating oil emerges at the inlet-side shaft sealing ring of the gear box and flows along the input shaft, it may reach the coupling part, for example, in the case of a vertical mounting direction of the gear motor, and is then spun off from the annular groove as a result of the centrifugal force acting on the lubricating oil, due to the coupling part's being set into rotary motion during operation. It is considered advantageous that a sensor for detecting the ejected oil may be positioned on the housing surrounding the coupling part. Consequently, even small amounts of leaking oil are detectable.

According to example embodiments, the part is made of metal, e.g., steel, e.g., by machining, e.g., by milling. In this context, it is considered advantageous that in the case of this metal cutting, deburring may be dispensed with.

According to an example embodiment of the present invention, a gear motor includes a part as mentioned above, the groove acting as a centrifugal edge, e.g., for spinning off leaked oil spreading out along the part, that is, e.g., lubricating oil leaking out of the gear box. In this context, it is considered advantageous that a claw coupling interposed between the gear box and the electric motor includes the part in the form of a claw coupling part, and that oil, which emerges through a leaky inlet-side seal of the gear box in the form of leaking oil and extends along the part, is spun off at the annular groove and may be detected by a sensor situated there.

According to an example embodiment of the present invention, in a method for manufacturing a part from a blank, the part may be manufactured from a lathe-machined blank, that is, from a rotationally symmetric blank. A circumferential annular groove is introduced on the radially outer surface, in particular, superficies, e.g., the ring axis of the annular groove being oriented coaxially to the axis of rotational symmetry of the blank. Subsequently, a planar surface, e.g., a machining surface, is produced by machining and/or by milling, the normal direction of the surface being oriented parallelly to the axis of rotational symmetry of the blank, and the surface being situated at an axial position covered by the annular groove.

In this context, it is considered advantageous that after the lathe-machining, only an annular groove has to be produced, and that then, the machining surface is subsequently producible by milling, without final deburring of the edge of the machining surface having to be performed.

Further features and aspects of example embodiments of the present invention are described in more detail below with reference to the appended schematic Figures.

DETAILED DESCRIPTION

Figure 1:
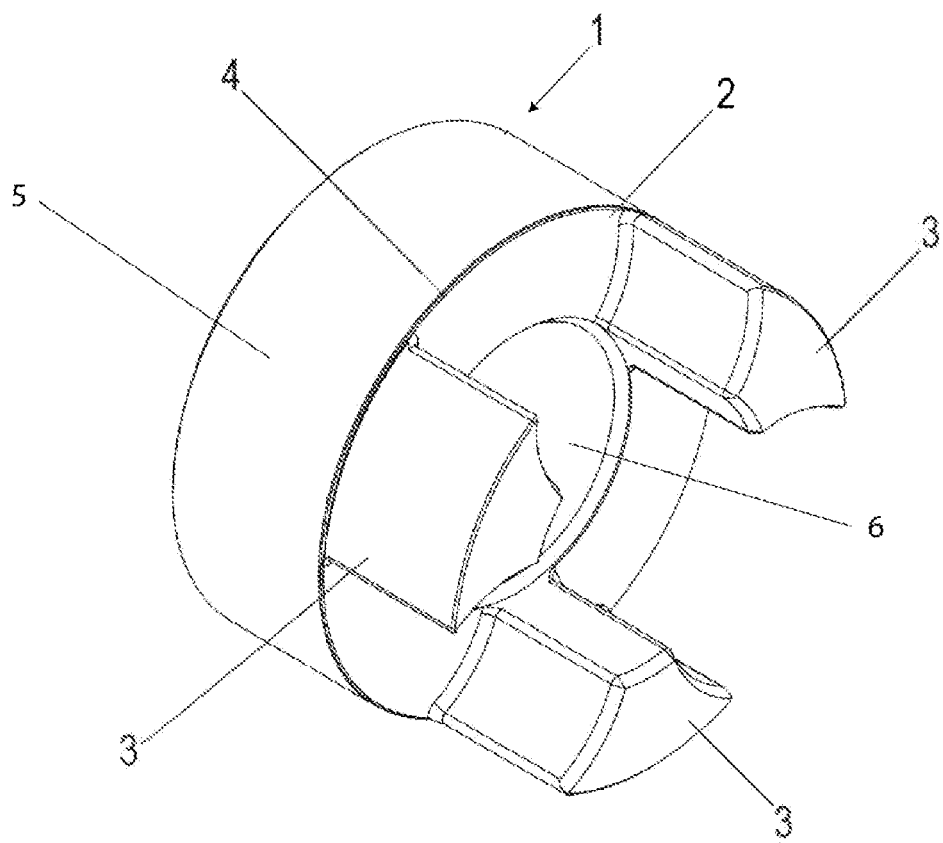
FIG. 1 is a perspective view of a coupling part of the present invention, e.g., a claw coupling part.

As schematically illustrated in the Figures, coupling part 1 includes a cylindrical region 6, e.g., a rotationally symmetric region 5, to which axially projection regions, e.g., claw regions 3, are contiguous, e.g., on which the claw regions are formed. The cylindrical region 6 is, for example, constructed as a hollow cylindrical region.

The claw regions are each shaped substantially identically and are evenly spaced apart from each other in the circumferential direction with respect to the cylinder axis, e.g., an axis of rotational symmetry. Claw regions 3 each cover the same axial region in the axial direction.

An annular groove extending around in the circumferential direction is situated on the coupling part, at the base region of claw regions 3, e.g., at the axial position of the transition between the cylindrical region and respective claw region 3.

Consequently, the annular groove is situated on the outer circumference of coupling part 1, e.g., in the axial transition region between the cylindrical region and claw region 3.

A machining surface 2 is situated between two claw regions 3 in the circumferential direction and is finished in a planar manner. During manufacturing, the free space situated between claw regions 3 in the circumferential direction is cleared by machining, e.g., with the aid of a milling cutter. In this instance, the axis of rotation of the milling cutter is positioned parallelly to, but set apart from, the cylinder axis of the cylindrical region.

Consequently, claw regions 3 have circular-cylindrical lateral surfaces on their opposing sides in the circumferential direction.

The milling cutter machines machining surface 2, as well; during the machining of the machining surface, that is, while cutting the material to be removed, the cutting edges of the milling cutter pushing out small residual regions of material at the radially outer edge of machining surface 2 in a plastically deforming manner, so that a burr would be formed, which, however, is prevented by annular groove 4 hereof.

This is because annular groove 4 has beveled groove walls, so that upon emergence from the material, the cutting edges of the milling cutter go out not at a 90° edge, but at a less sharp edge.

Machining surface 2 is, for example, situated at the axial position, at which the deepest point of the groove, e.g., the base of the groove, is situated.

Figure 2:
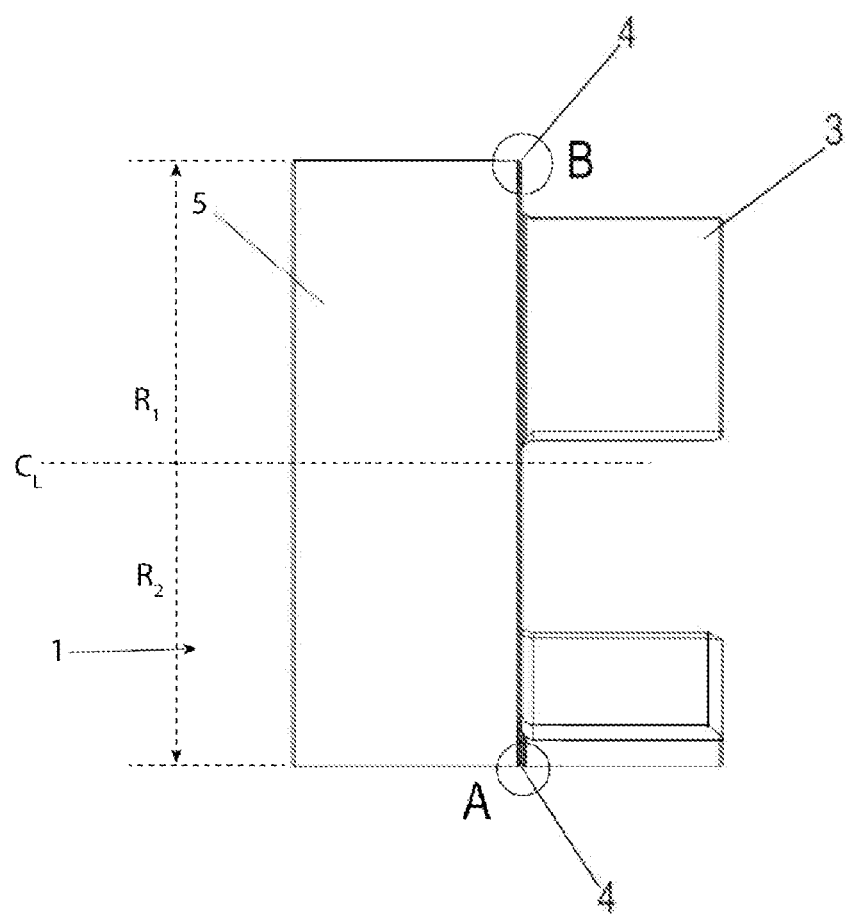
FIG. 2 is a side view of the coupling part.

As illustrated, for example, in FIG. 2, a radial distance region $R_1$ covered by the rotationally symmetric region is contained in and/or surrounded by a radial distance region $R_2$ covered by the axially projecting region, $C_L$ indicating the axis of rotational symmetry of the rotationally symmetric region 5.

Figure 3:
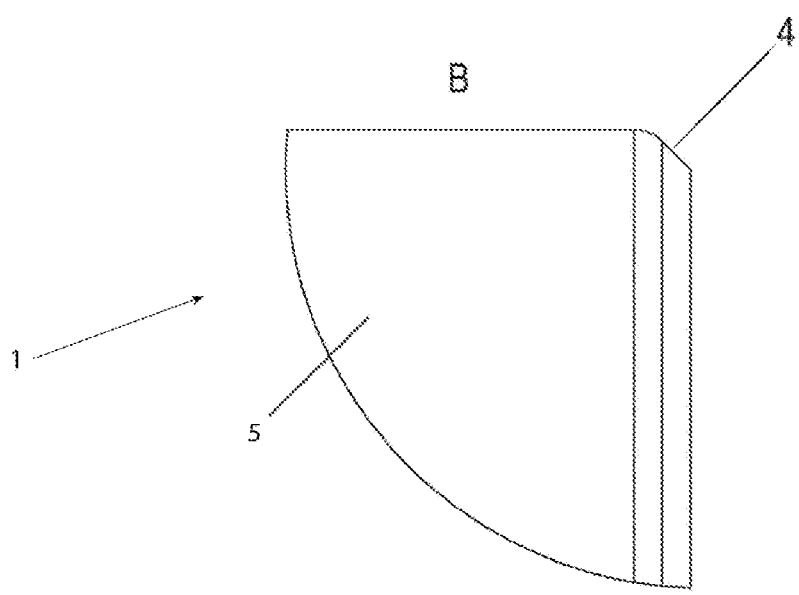
FIG. 3 is an enlarged view of the coupling part.

Thus, as illustrated in FIG. 3, only one of the two groove walls of the annular groove are present after the machining surface is produced.

Figure 4:
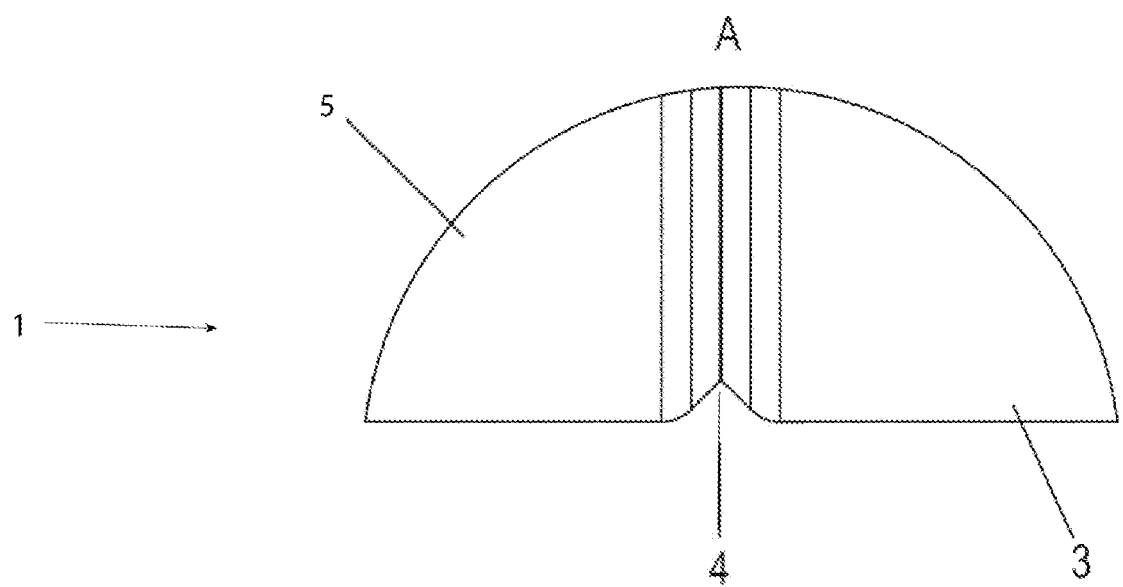
FIG. 4 is another enlarged view of the coupling part.

However, as illustrated in FIG. 4, annular groove 4 is fully preserved in the circumferential angular region covered by respective claw region 3.

In the illustrated exemplary embodiment, annular groove 4 is constructed in the form of a V-groove, as illustrated in FIG. 4.

In further exemplary embodiments, a circular groove or another groove shape is used instead of the V-groove. In this context, the groove walls may be shaped continuously to the base of the groove, that is, e.g., not to fall perpendicularly to the groove base, but linearly or curved. Therefore, after the machining, e.g., by milling, broaching, slotting, and/or drawing, an edge angle different from 90° may be produced, and thus, the formation of an interfering burr may be prevented.

In other exemplary embodiments, instead of the coupling part, a different rotationally symmetric part having a circumferential annular groove is manufactured. The base of the groove has the same axial position as a machined surface, that is, machining surface, which is planar, and whose normal direction is parallel to the axis of rotational symmetry of the part.

Expressed in general terms, example embodiments of the present invention relate to a lathed part, into which an annular groove is introduced and, subsequently, a planar machining surface is introduced by machining, e.g., milling. The normal direction of the machining surface is oriented parallelly to the axis of rotation. The region, which is covered by the annular groove and is axial, for example, with respect to the axis of rotation, includes the axial position of the machining surface. Subsequent deburring is omitted.

What is claimed is:

1. A part, comprising:
    a rotationally symmetric region;
    a machining surface finished in a planar manner, a normal direction of the machining surface being oriented parallel to an axis of rotational symmetry of the rotationally symmetric region; and
    an annular recess that extends entirely around the part in a circumferential direction and arranged in an axial location of the part that coincides with an axial location of the machining surface;
    wherein, in a circumferential angular region not covered by the machining surface, the annular recess is axially symmetric and arranged as a groove, and, in a circumferential angular region covered by the machining surface, the annular recess is axially asymmetric and arranged as one axial half of the groove.

2. The part according to claim 1, wherein the axis of rotational symmetry includes an axis of rotation.

3. The part according to claim 1, wherein the annular recess extends around in the circumferential direction with respect to the axis of rotational symmetry.

4. The part according to claim 1, wherein, in the circumferential region covered by the machining surface, the annular recess is removed down to a groove base of the annular groove.

5. The part according to claim 1, wherein the machining surface borders on the annular recess and/or leads into the annular recess.

6. The part according to claim 1, wherein the rotationally symmetric region includes a cylindrical section and/or a hollow cylindrical section.

7. The part according to claim 1, wherein the machining surface is situated at an axial position covered by the annular recess.

8. The part according to claim 1, wherein an axially projecting region is provided on the rotationally symmetric region, and a region of the annular recess is arranged between the rotationally symmetric region and the axially projecting region.

9. The part according to claim 8, wherein a radial distance region covered by the rotationally symmetric region is contained in and/or surrounded by a radial distance region covered by the axially projecting region.

10. The part according to claim 8, wherein the part is arranged as a claw coupling part, the axially projecting region includes a claw region, and the rotationally symmetric region includes a cylindrical and/or a hollow cylindrical region.

11. The part according to claim 1, wherein the part is formed of metal and/or of steel.

12. The part according to claim 1, wherein the part is a machined, milled, broached, slotted, and or drawn part.

13. A gear motor, comprising:
the part recited in claim 1, wherein the annular recess is arranged as a centrifugal edge.

14. The gear motor according to claim 13, wherein the annular recess is adapted to spin off leaked oil spreading out along the part.

15. The gear motor according to claim 13, wherein the annular recess is adapted to spin off lubricating oil that leaks out of a gear box of the gear motor.

16. A method for manufacturing the part recited in claim 1 from a blank, comprising:
introducing a circumferential annular recess on a radially outer surface of the blank; and
subsequently, machining and/or milling a planar surface and/or a machining surface in the blank having a normal direction oriented parallelly to an axis of rotational symmetry of the blank and being arranged at an axial position covered by the annular recess.

17. The method according to claim 16, wherein the blank is produced rotationally symmetrically by lathing.

18. The method according to claim 16, wherein a ring axis of the annular recess is oriented coaxially to the axis of rotational symmetry of the blank.

19. The part according to claim 1, wherein in the circumferential angular region covered by the machining surface, the annular recess is arranged as a bevel.

20. The part according to claim 19, wherein in the circumferential angular region not covered by the machining surface, the groove is arranged as a pair of symmetric and abutting bevels.

21. The part according to claim 1, wherein in the circumferential angular region not covered by the machining surface, the groove is arranged as a pair of symmetric and abutting bevels.

* * * * *